United States Patent [19]

Nishimura et al.

[11] Patent Number: 4,909,079
[45] Date of Patent: Mar. 20, 1990

[54] HEAT WIRE AIRFLOW METER

[75] Inventors: Yutaka Nishimura; Izumi Watanabe; Hiroshi Yoneda; Hiroatsu Tokuda, all of Katsuta, Japan

[73] Assignees: Hitachi, Ltd., Tokyo; Hitachi Automotive Engineering Co., Ltd., Ibaraki, both of Japan

[21] Appl. No.: 370,073

[22] Filed: Jun. 23, 1989

Related U.S. Application Data

[63] Continuation of Ser. No. 218,272, Jul. 13, 1988, abandoned.

[30] Foreign Application Priority Data

Jul. 13, 1987 [JP] Japan .................. 62-172905

[51] Int. Cl.$^4$ ............................ G01F 1/68; H01C 1/32
[52] U.S. Cl. .................... 73/204.27; 338/25; 338/258; 338/263; 338/269
[58] Field of Search ........... 73/204.25, 204.26, 204.27, 73/118.2; 338/25, 256–258, 262–269, 286, 296, 303

[56] References Cited

U.S. PATENT DOCUMENTS

| | | | |
|---|---|---|---|
| 3,205,467 | 9/1965 | Ganci | 338/268 |
| 3,643,200 | 2/1972 | Brandi | 338/258 |
| 3,803,708 | 4/1974 | Wada et al. | 338/258 |
| 4,790,182 | 12/1988 | Takahashi et al. | 73/204.27 |

*Primary Examiner*—Herbert Goldstein
*Attorney, Agent, or Firm*—Antonelli, Terry & Wands

[57] ABSTRACT

A heat wire type airflow meter having a resistance element disposed within an airflow, the rate of which is measured, and a detection circuit for producing an airflow rate signal by detecting resistance change of the element depending on the airflow rate, in which the resistance element comprises a heat wire coil, lead wires attached to the heat wire coil at both ends thereof, a ceramic layer covering the heat wire coil and junctions of the heat wire coil and the lead wires to form a cylindrical member in such a manner that the heat wire coil is contained therein coaxially and along an inner surface thereof and a glass layer for coating an outer surface of the cylindrical member.

28 Claims, 3 Drawing Sheets

HEAT WIRE AIRFLOW METER

This is a continuation of Ser. No. 218,272, filed 7/13/88, now abandoned.

BACKGROUND OF THE INVENTION

1. Field of the Invention

The present invention relates to an airflow meter of a so-called heat (or hot) wire type with an improved exothermic resistance element and a manufacturing method of the improved resistance element.

2. Description of the Related Art

There has been already known an airflow meter using a resistance element made functioning as an exothermic resistor, in which a current flowing through the resistance element is adjusted so as to maintain the temperature of the element at a predetermined value and the temperature drop in the element, which is caused by air flowing in contact therewith, is detected as change in the current flowing therethrough, whereby the rate of the airflow can be measured. Such an airflow meter is known as a heat wire type airflow meter, which is now widely employed for the purpose of measuring the airflow rate of an intake air of an internal combustion engine.

Also, there have been already known various sorts of resistance elements used in the heat wire type airflow meter. As one of them, there is a resistance element, in which a resistance wire such as platinum, nickel, platinum-cobalt alloy and so on is wound on a bobbin of sufficiently sintered ceramics to form a heat wire coil functioning as an exothermic resistor (JP-A-54/145166(1979)). Since such a heat wire is very fine, the ceramic bobbin gives the sufficient mechanical strength to the heat wire coil and, hence, to the resistance element as a whole.

However, although the aforesaid resistance element with the ceramic bobbin has the sufficient mechanical strength, it is accompanied with the following defect. Namely, a part of heat generated by the heat wire coil is consumed to heat the ceramic bobbin, and the heat transferred to the bobbin in turn escapes outside through support members coupled to the bobbin. This results in the reduction in the measuring accuracy. In addition, the response time of the airflow meter to change in the rate of airflow to be measured becomes worse due to the heat capacity of the bobbin.

To improve this defect, one of the inventors of the present invention has already proposed a heat wire type airflow meter, which has an improved resistance element without any bobbin, i.e., a bobbinless resistance element (JP-A-62/83622 (published Apr. 17, 1987)). According to the prior art described above, an exothermic resistance wire is wound in the coil form on a core wire, and after the coiled resistance wire is coated and solidified by glass material, the core wire is removed by acid, whereby a bobbinless resistance element is obtained and an airflow meter, which is free from the influence of the heat capacity of the ceramic bobbin, can be realized.

It has been found, however, that the prior art has the following problem, especially when molybdenum is used as a core wire for winding a resistance wire. Namely, upon sintering of a coating layer of glass, glass is crystallized under the influence of the molybdenum core wire, with the result that the evenness of the outer surface of a finished resistance element is lost. The roughness of the outer surface of a resistance element causes the disturbance in the airflow to be measured and the accumulation of dust included in air thereon. Those facts exert a great influence upon the measuring accuracy of a heat wire type airflow meter.

SUMMARY OF THE INVENTION

It is an object of the present invention to provide a heat wire type airflow meter having a resistance element with an improved structure, which is capable of the high accuracy measuring, and a method specially adapted for the manufacture of such a resistance element.

A feature of the present invention is in the following; in a heat wire type airflow meter having air passage means for defining an airflow, the rate of which is to be measured, resistance element means disposed within the air passage means and functioning as an exothermic resistor, and detection circuit means for supplying a current to the resistance element means and producing an output signal in proportion to the airflow rate by detecting change in a resistance value of the resistance element means, which is dependent on change in the airflow rate, the resistance element means comprises a heat wire coil formed by a heat wire, which functions as a exothermic resistor lead wires attached to the heat wire coil at both ends thereof and electrically coupling the heat wire coil to the detection circuit means, a first layer of ceramics covering the heat wire coil and junctions of the heat wire coil and the lead wires to form such a cylindrical member that the heat wire coil is contained therein coaxially and substantially along an inner surface thereof and a second layer of glass for coating an outer surface of the cylindrical member.

The resistance element as mentioned above can be manufactured as follows; a heat wire is wound on a core wire to form a heat wire coil, lead wires are attached to both ends of the heat wire coil, a first layer of ceramics is formed on the heat wire coil provided with the lead wires at both ends thereof so as to cover the heat wire coil together with junctions of the heat wire coil and the lead wires, but not to cover both end surfaces of the core wire, the core wire is removed by chemical etching to form a cylindrical member containing therein the heat wire coil coaxially and substantially along an inner surface thereof, and a second layer of glass is coated thoroughly over an outer surface of the cylindrical member.

As apparent from the above description, since there exists the first layer of ceramics between the second layer of glass and the core wire, both of them never react to each other when glass of the second layer is sintered. Therefore, a resistance element with the even outer surface is obtained, and with such a resistance element, a heat wire type airflow meter having the high measuring accuracy can be realized.

BRIEF DESCRIPTION OF THE DRAWINGS

FIG. 1b is a sectional view of the airflow meter taken along the line X—X in FIG. 1a;

DESCRIPTION OF THE PREFERRED EMBODIMENTS

Referring at first to figures, there will be discussed on a heat wire type airflow meter, taking an airflow sensor for use in an internal combustion engine as an example.

Figure 1A:
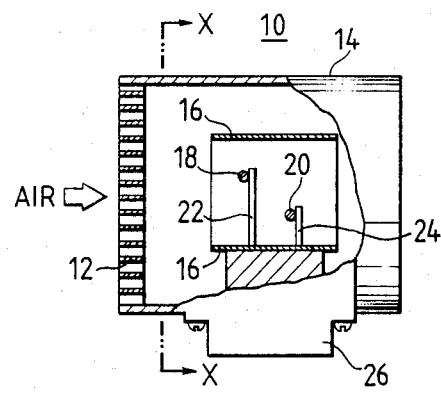
FIG. 1a is a partial sectional view illustrating the structure of a heat wire type airflow meter of the present invention incorporating therein an improved resistance element.
Figure 1B:
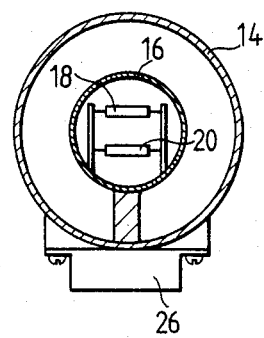

FIGS. 1a and 1b show the structure of airflow meter 10 of the heat wire type, in which rectification member 12 is fitted on the side of an inlet of air introduction pipe 14. Air, which flows into the pipe 14, as shown by an arrow, is turned into substantially parallel air stream by the rectification member 12, so that the occurrence of a turbulent flow can be prevented.

Inner pipe 16 is disposed within the intake pipe 14 almost coaxially therewith to define the airflow to be measured. Lead wires of resistance element 18 for measurement and resistance element 20 as a temperature compensation probe, both having the same construction, are fixed to support members 22 and 24 projected inside the inner pipe 16 by means of spot-welding or brazing, respectively. The resistance elements 18 and 20 are electrically coupled to detection circuit 26 through the support members 22 and 24, which are made of electrically conductive material.

Figure 2:
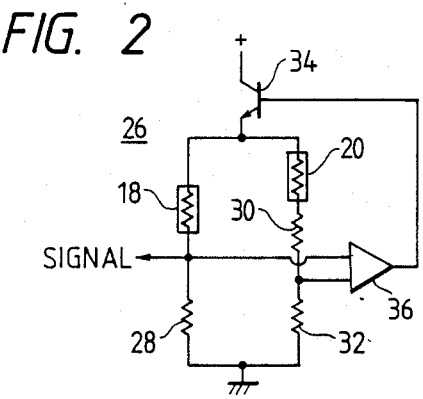
FIG. 2 is a diagram schematically showing an example of a detection circuit of the heat wire type airflow meter.

The detection circuit 26 has a bridge circuit configuration as shown in FIG. 2. Namely, a series connection of the resistance element 18 and fixed resistor 28 and a series connection of the resistance element 20 and fixed resistors 30, 32 are connected in parallel with each other. Further, a junction between the fixed resistors 28 and 32 is grounded, and a junction between the resistance elements 18 and 20 is coupled to an emitter of transistor 34, a collector of which is coupled to a power supply. Furthermore, a junction between the resistance element 18 and the fixed resistor 28 and a junction between the fixed resistors 30 and 32 are coupled to input terminals of differential amplifier 36, respectively. An output of the amplifier 36 is supplied to a base of the transistor 34.

In this bridge circuit, a current is made to flow through the resistance element 18 so that it attains a predetermined temperature, and the bridge circuit is brought into equilibrium under such a condition. When the intake air is blown to the resistance element 18, the temperature thereof changes and accordingly there occurs change in a resistance value of the resistance element 18. Since the temperature change depends on the flow rate of the intake air, an output signal, which can be derived from the junction of the resistance element 18 and the resistor 28, also corresponds to the flow rate of the intake air.

There is provided the resistance element 20 for the purpose of accurately measuring the flow rate of the intake air without any influence of the temperature of the intake air. Namely, although a flow rate signal detected fluctuates in response to the temperature change of the intake air, such fluctuation can be compensated by providing the resistance element 20. Since the temperature compensation function by the resistor element 20 is already known, further description thereof will be omitted.

Figure 3:
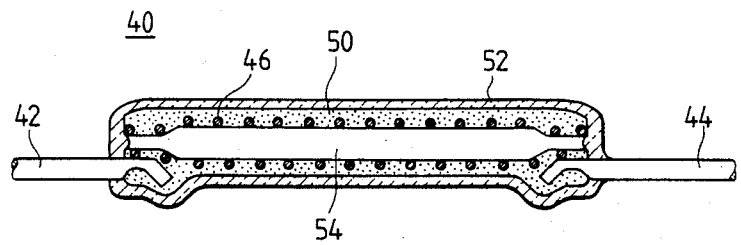
FIG. 3 is a sectional view showing the structure of a resistance element for a heat wire type airflow meter according to an embodiment of the present invention.

In FIG. 3, there is shown a sectional view of the structure of resistance element 40, which is used as the elements 18, 20 in the airflow meter shown in FIGS. 1a and 1b. The resistance element 40 is attached to the support members 22, 24 by lead wires 42, 44 provided at both ends thereof and be disposed within an airflow, the rate of which is to be measured Further, as already described the element 40 is also coupled electrically to the detection circuit 26 through the support members 22 24 and the lead wires 42, 44.

The resistance element 40 comprises a heat wire coil made of a heat wire 46 of material, such as platinum, nickel, platinum-cobalt alloy and so on, functioning as the exothermic resistor, a cylindrical ceramic member 50, which contains therein the heat wire coil coaxially and substantially along an inner surface thereof and fixes junctions of the heat wire coil and the lead wires 42, 44, and a glass coating layer 52 for covering an outer surface and one or both end openings of the cylindrical member 50.

Figure 4:
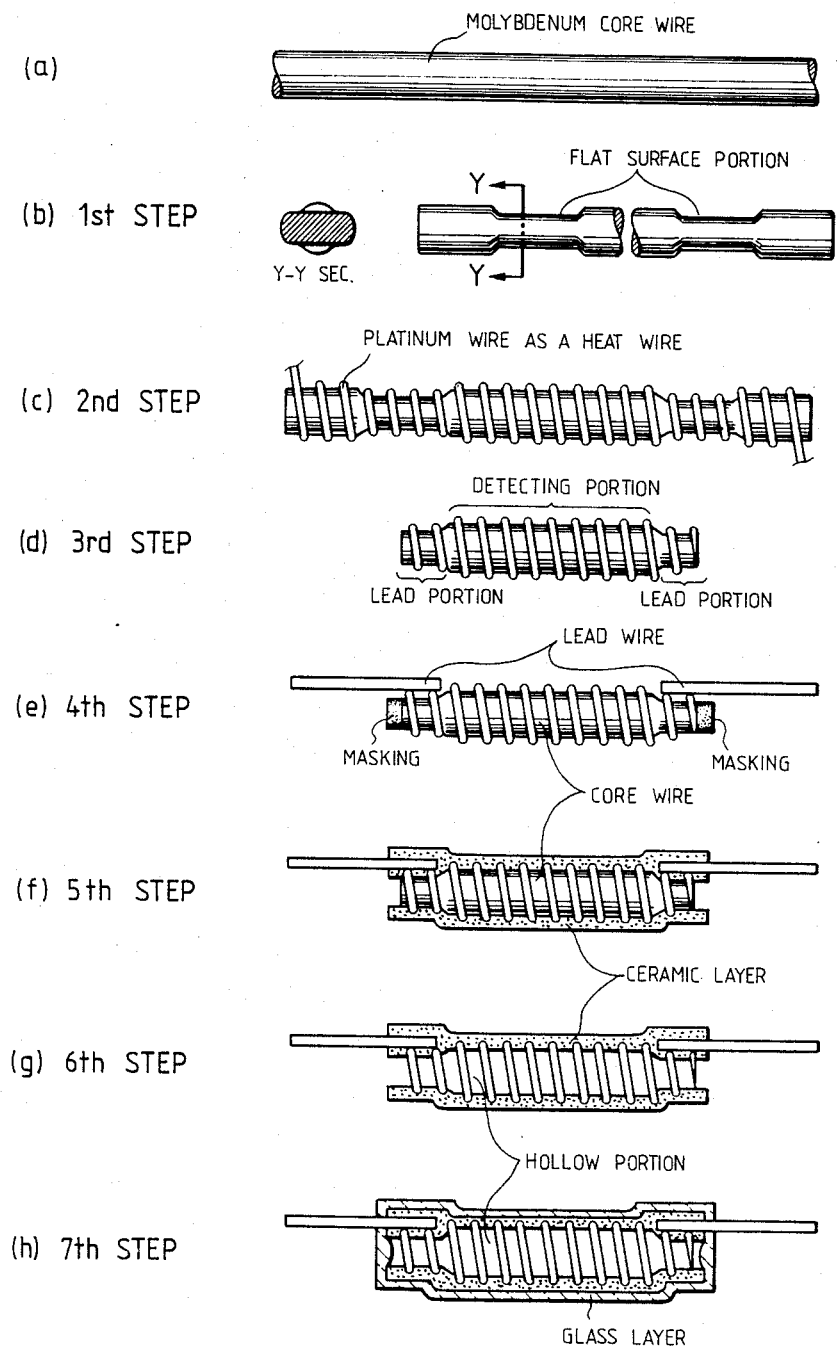
FIG. 4a–4h is an explanatory drawing for illustrating steps of the process for manufacturing the resistance element as shown in FIG. 3.

As apparent from the above description, the structural difference of the resistance element 40 from the prior art resistance element already described is in that an inorganic layer consists of two layers, i.e., the first layer 50 of ceramics and the second layer 52 of glass Therefore, the first layer 50 exists between the second layer 52 and the hollow portion 54, which is the remains of a core wire removed In the following, a method of manufacturing the resistance element as described above will be explained with reference to FIG. 4.

There is at first provided a wire of molybdenum as shown in FIG. 4(a), which is used as material for a winding core. The diameter of the core wire is about 0.3 to 0.5 mm. Other than the molybdenum wire, Fe-Ni wire, plastic wire and so on are also available as material for the core wire. In a first step of the manufacturing process, the core wire is cut into an appropriate length, and portions close to both ends of the core wire are pressed so as to form partially flat surface portions (cf. FIG. 4(b)). Next, in a second step of the process, a platinum wire of the diameter of 0.02 to 0.05 mm as a heat wire is wound on the core wire and a heat wire coil is formed thereon (cf. FIG. 4(c)). The flat surface portions provided on the core wire in the first step are useful for preventing the heat wire coil formed in the second step from getting undone.

In a third step of the process, the core wire provided thereon with the heat wire coil is cut into a length necessary for the resistance element with a part of the flat surface portions remaining at both ends of the core wire (cf. FIG. 4(d)). Further, in the heat wire coil as shown in FIG. 4(d), a central major portion thereof functions as a detecting portion, and the flat surface portions, at both ends are used as lead portions, at which the lead wires are attached to the heat wire coil, as described below.

In a fourth step of the process, the lead wires are fixedly attached to the lead portions by means of spot-welding or brazing (cf. FIG. 4(e)) so as to integratedly couple all of the core wire, the heat wire coil and the lead wires. With this, handling of the deformative heat wire coil in succeeding steps of the manufacturing process is facilitated, because the sufficient stiffness is given by the core wire. Further, since the lead portions have the flat surface, the lead wires can be attached thereto stably and reliably. Also in this step, masking material such as vinyl chloride resin is applied to one or both end surfaces of the core wire, as shown in the figure In a fifth step of the process, a first layer of ceramics is formed so as to cover the heat wire coil formed on the core wire and both junctions of the heat wire coil and the lead wires thoroughly (cf. FIG. 4(f)). To this end, ceramic powder is deposited on the heat wire coil formed on the core wire by means of electrophoresis, thermal spraying or dipping. The ceramic powder is deposited so as to also cover a part of the lead wires Then, it is sintered in a furnace with the ceramic powder deposited thereon, whereby the first layer of ceramics is formed However, the ceramic layer is not formed on one or both end surfaces of the core wire, because there are applied the masking material thereto (cf. FIG. 4(f)).

If, during sintering in the furnace, the platinum wire is exposed to temperature higher than about 1300° C., recrystallization of platinum occurs, with the result that the platinum wire is made to be brittle, and the temperature coefficient of resistance value thereof changes, too. Therefore, the first layer must be formed by using ceramic material which can be solidified at temperature lower than about 1300° C.

There can be used, for example, a mixture of alumina and a small amount of borosilicate glass as a binder. The reason why such a binder is mixed is as follows. Since the sintering is carried out at the relatively low temperature as described above, the first layer never gain the sufficient mechanical strength by the sintering, if it is composed of ceramics only. Accordingly, a binder, the melting point of which is lower than the aforesaid temperature, is mixed into ceramic powder During sintering of the ceramics, the binder melts and infiltrates the ceramic powder to firmly bind particles thereof, although the temperature may be low for the perfect sintering of ceramics.

Experimentally, a mixing ratio of ceramic material and a binder was preferable to be 1 to 0.05–0.2 in weight, when glass was used as a binder. If an amount of glass as the binder is too small, the sufficient mechanical strength of a finished resistance element can not be obtained. On the contrary, with too much glass as the binder, glass of the second layer becomes difficult to infiltrate the first layer due to the excess glass component therein, with the result that the thermal contact between the first layer and the platinum wire becomes worse.

Although, other than alumina, well known ceramic material, such as silica, magnesium oxide, silicon carbide, silicon nitride, etc., can be used as major component of material for the first layer, alumina is preferable in view of the fact that it is easily available and chemically stable against both platinum as exothermic resistor material and molybdenum as core wire material.

In the next step, the heat wire coil with the core wire, which is covered by the first layer, is dipped into a solution of mixed acid (for example, 50% of sulfuric acid, 30% of nitric acid and water as the remainder), which functions as an etchant of the core wire. When the heat wire coil covered by the first layer is dipped into such an etchant, the core wire begins to be etched from one or both of the exposed end surfaces thereof. After completion of etching, there is obtained a cylindrical ceramic member having a hollow portion opened at both ends thereof, which contains therein the heat wire coil coaxially and along an inner surface thereof (cf. FIG. 4(g)).

Further, although it may take longer time, the etching of the core wire can be achieved by making an etchant penetrate through gaps of particles of the ceramics even without the opening at one or both ends of the hollow portion 54. In this case, masking procedure in the fourth step can be omitted.

As already described, the sintering in the fifth step is carried out at the temperature lower than 1300° C. Such an upper limit of the sintering temperature is selected so as to present the platinum wire from being made brittle by a high temperature. On the other hand, however, the sintering at such low temperature can not afford the first layer of ceramics the sufficient mechanical strength Then, at the last step of the process, the surface of the first layer is covered by the second layer of glass, which has a relatively low melting temperature (cf. FIG. 4(h)).

To this end, glass powder is deposited on the outer surface of the first layer by means of electrophoresis, thermal spraying or dipping, and then sintered at a relatively low temperature. During this sintering, glass penetrates the first layer and reinforces the layer of ceramics In addition, the glass layer also has the effect of making the outer surface of the resistance element smooth, whereby dust included in air flowing in contact with the resistance element is difficult to adhere to and accumulate on the outer surface thereof In this manner, a two-layer inorganic coating consisting of the first layer of ceramics and the second layer of glass, which covers and fixes the heat wire coil and the lead wires integratedly, is formed in such a manner that the insufficient mechanical strength of the first layer is reinforced b the second layer. As a result, the resistance element has the extremely stiff structure as a whole.

Figure 5:
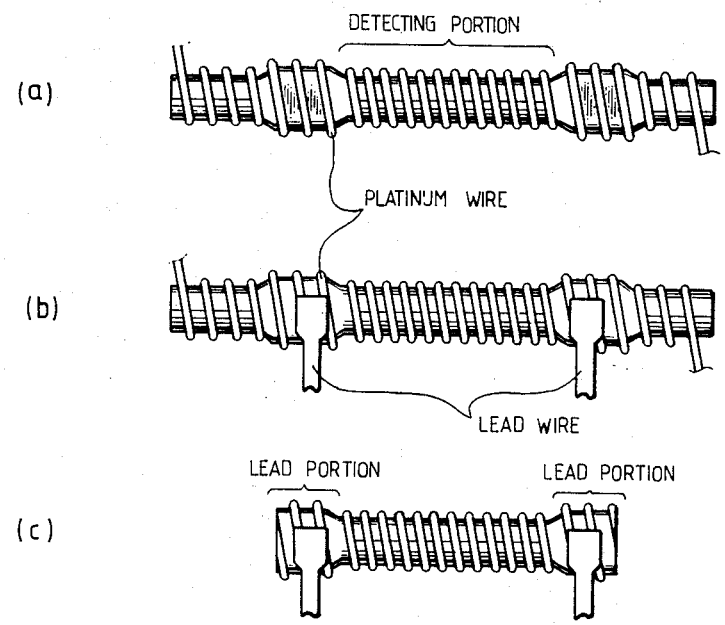
FIG. 5a–5c is a drawing for explaining the structure of another example of a resistance element and a part of steps of the manufacturing process thereof.

Further, there is considered a partial modification to the embodiment described above, by which the formation of the heat wire coil is improved FIG. 5 shows a part of steps of the manufacturing process of the modification. The modified process is the same as the process of FIG. 4 in the first two steps. Namely, a platinum wire as a heat wire is wound on a core wire provided with flat surface portions closely to both ends thereof (cf. FIG. 5(a)). It is to be noted, however, that although FIG. 5(a) corresponds to FIG. 4(c), the former drawing shows the core wire provided thereon with the heat wire coil, viewed from the upper side in the latter drawing.

Being different from the aforesaid embodiment, lead wires are attached to the flat surfaces of both lead portions by spot-welding or brazing, before the core wire provided thereon with the heat wire coil is cut into a length necessary for the resistance element (cf. FIG. 5 (b)). THen, the core wire is cut into a necessary length, after the lead wires are attached (cf. FIG. 5(c)).

In this manner, since the lead wires are attached to the heat wire coil before cutting of the core wire, they are necessary to be attached to the core wire in such a manner that the existence of the lead wires does not disturb the working of cutting the core wire; therefore they are attached, for example, almost perpendicularly to the axial direction of the heat wire coil, as shown in FIG. 5(b). By fixing the lead wires before cutting of the core wire, the heat wire coil never gets undone when the core wire is cut.

FIG. 5(c) and FIG. 4(e) correspond to each other, in which there is shown the length-adjusted heat wire coil with the lead wires attached at both ends thereof The subsequent steps of the process in this modification are the same as those of FIG. 4(f) and the following in the aforesaid embodiment.

Further, it is to be noted that, in FIG. 5, the heat wire is wound on the core wire densely, i.e., at the small pitch, in the detecting portion of the heat wire coil and thinly, i.e., at the large pitch, in the lead portions thereof. With this, a resistance value of the resistance element is free from the accuracy of the position of the junctions of the heat wire coil and the lead wires, because it is almost determined by the heat wire densely wound in the detecting portion In the foregoing, a limited number of forms of an airflow meter with an improved resistance element, which embodies the present invention, have been described in detail. It is to be understood, however, that the present invention is never limited to the forms described, but various changes and modifications may be made therein within the scope of the appended claims without departing from the spirit and scope of the present invention.

What is claimed is:

1. A heat wire type airflow meter, having:
   air passage means for defining an airflow, the rate of which is to be measured;
   resistance element means disposed within said air passage means and function as an exothermic resistor; and
   detection circuit means for supplying a current to said resistance element means and producing an output signal in proportion to the airflow rate by detecting change in a resistance value of said resistance element means, which is dependent on change in the airflow rate,
   characterized in that said resistance element means comprising:
   a heat wire coil formed by a heat wire, which functions as a exothermic resistor;
   lead wires attached to said heat wire coil at both ends thereof and electrically coupling said heat wire coil to said detection circuit means;
   a first layer of ceramics covering said heat wire coil and junctions of said heat wire coil and said lead wires to form a hollow cylindrical member such that said heat wire coil is contained therein coaxially and substantially along an inner surface thereof; and
   a second layer of glass for coating an outer surface of the cylindrical member.

2. A heat wire type airflow meter as defined in claim 1, characterized in that openings at both ends of the cylindrical member are closed by said second layer.

3. A heat wire type airflow meter as defined in claim 1, characterized in that said heat wire coil is wound at the smaller pitch in the central portion thereof than in both end portions thereof.

4. A heat wire type airflow meter as defined in claim 1, characterized in that said lead wires are attached to said heat wire coil almost perpendicularly to the axial direction of said heat wire coil.

5. A heat wire type airflow meter as defined in claim 1, characterized in that said heat wire coil has flat surface portions at both ends thereof, at which said lead wires are attached.

6. A heat wire type airflow meter as defined in claim 1, characterized in that said first layer is formed by a mixture, which includes ceramics as a major component and a small amount of a binder.

7. A heat wire type airflow meter as defined in claim 6, wherein said binder is glass.

8. A heat wire type airflow meter as defined in claim 6, characterized in that the mixing ration of ceramics and the binder is 1 to 0.05–0.2 in weight.

9. A heat wire type airflow meter, having:
   air passage means for defining an airflow, the rate of which is to be measured;
   resistance element means disposed within said air passage means and functioning as an exothermic resistor; and
   detection circuit means for supplying a current to said resistance element means and for producing an output signal in proportion to the airflow rate;
   characterized in that said resistance element means comprises:
   a heat wire coil formed by a heat wire, which functions as an exothermic resistor;
   lead wires attached to said heat wire coil at both ends thereof and electrically coupling said heat wire coil to said detection circuit means;
   a first layer of ceramics covering said heat wire coil and junctions of said heat wire coil and said lead wires to form a cylindrical hollow member such that said heat wire coil is contained therein coaxially and substantially along an inner surface thereof; and
   a second layer of glass coating an outer surface of the cylindrical member.

10. A heat wire type airflow meter as defined in claim 9, wherein openings at both ends of the cylindrical member are closed by said second layer.

11. A heat wire type airflow meter as defined in claim 9, wherein said first layer is formed by a mixture, which includes ceramics as a major component and a small amount of binder.

12. A heat wire type airflow meter as defined in claim 9, wherein said heat wire coil has flat surface portions at both ends thereof, at which said lead wires are attached.

13. A sensor having an air passage means for defining an airflow, a characteristic of which is to be measured; resistance element means disposed within said air passage means and functioning as an exothermic resistor; and detection circuit means for supplying a current to said resistance element means and for producing an output signal in proportion to said characteristic which is to be measured; characterized in that said resistance element means comprises:
   a resistance wire coil formed by a resistance wire, which functions as an exothermic resistor;
   lead wires attached to said resistance wire coil at both ends thereof and electrically coupling said resistance wire coil to said detection circuit means;
   a first layer of ceramics covering said resistance wire coil and junctions of said resistance wire coil and said lead wires to form a cylindrical hollow member such that said resistance wire coil is contained therein coaxially and substantially along an inner surface thereof; and
   a second layer of glass coating an outer surface of the cylindrical member.

14. A sensor as defined in claim 13, wherein openings at both ends of the cylindrical member are closed by said second layer.

15. A sensor as defined in claim 13, wherein said resistance wire coil is wound at a smaller pitch in the central portion thereof than in both end portions thereof.

16. A sensor as defined in claim 13, wherein said lead wires are attached to said resistance wire coil almost perpendicularly to the axial direction of said resistance wire coil.

17. A sensor as defined in claim 13, wherein said resistance wire coil has flat surface portions at both ends thereof, at which said lead wires are attached.

18. A sensor as defined in claim 13, wherein said first layer is formed by a mixture, which includes ceramics as a major component and a small amount of a binder.

19. A sensor as defined in claim 18, wherein said binder is glass.

20. A sensor as defined in claim 18, wherein the mixing ratio of ceramics and the binder is 1 to 0.05–0.2 in weight.

21. A resistance element for measuring characteristics of an airflow in an air passage, comprising:
 a resistance wire coil formed by a resistance wire, which functions as an exothermic resistor;
 lead wires attached to said resistance wire coil at both ends thereof;
 a first layer of ceramics covering said resistance wire coil and junctions of said resistance wire coil and said lead wires to form a cylindrical hollow member such that said resistance wire coil is contained therein coaxially and substantially along an inner surface thereof; and
 a second layer composed of glass coating an outer surface of said cylindrical member.

22. A resistance element as defined in claim 21, wherein openings at both ends of the cylindrical member are closed by said second layer.

23. A resistance element as defined in claim 21, wherein said resistance wire coil is wound at a smaller pitch in the central portion thereof than in both end portions thereof.

24. A resistance element as defined in claim 21, wherein said lead wires are attached to said resistance wire coil almost perpendicularly to the axial direction of said resistance wire coil.

25. A resistance element as defined in claim 21, wherein said resistance wire coil has flat surface portions at both ends thereof, at which said lead wires are attached.

26. A resistance element as defined in claim 21, wherein said first layer is formed by a mixture, which includes ceramics as a major component and a small amount of a binder.

27. A resistance element as defined in claim 26, wherein said binder is glass.

28. A resistance element as defined in claim 26, wherein the mixing ratio of ceramics and the binder is 1 to 0.05–0.2 in weight.

* * * * *